Nov. 21, 1939.　　　O. J. HORGER　　　2,180,363
APPARATUS FOR TESTING AXLES AND THE LIKE
Filed Dec. 23, 1937　　　3 Sheets-Sheet 1
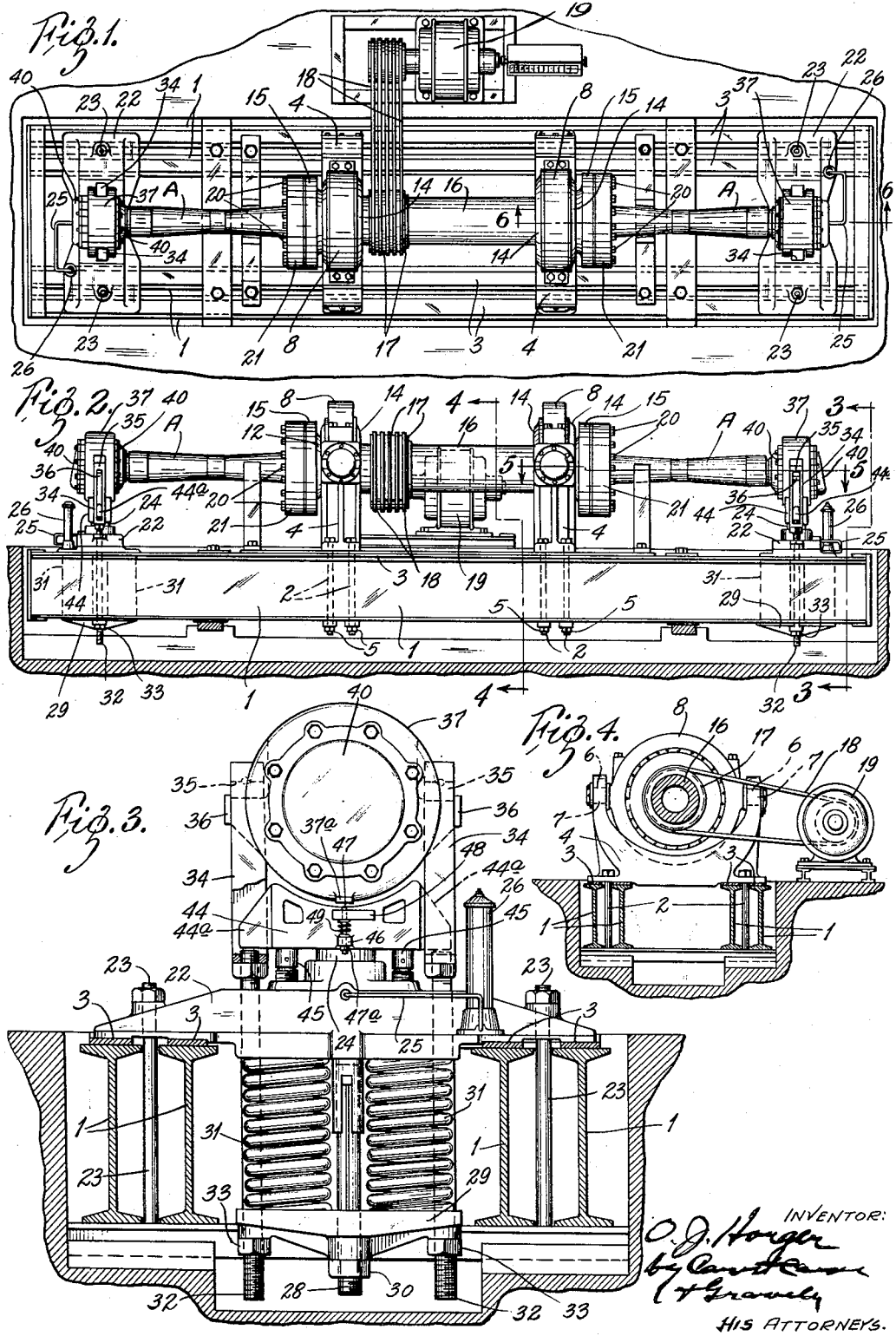

Nov. 21, 1939.    O. J. HORGER    2,180,363
APPARATUS FOR TESTING AXLES AND THE LIKE
Filed Dec. 23, 1937    3 Sheets-Sheet 2
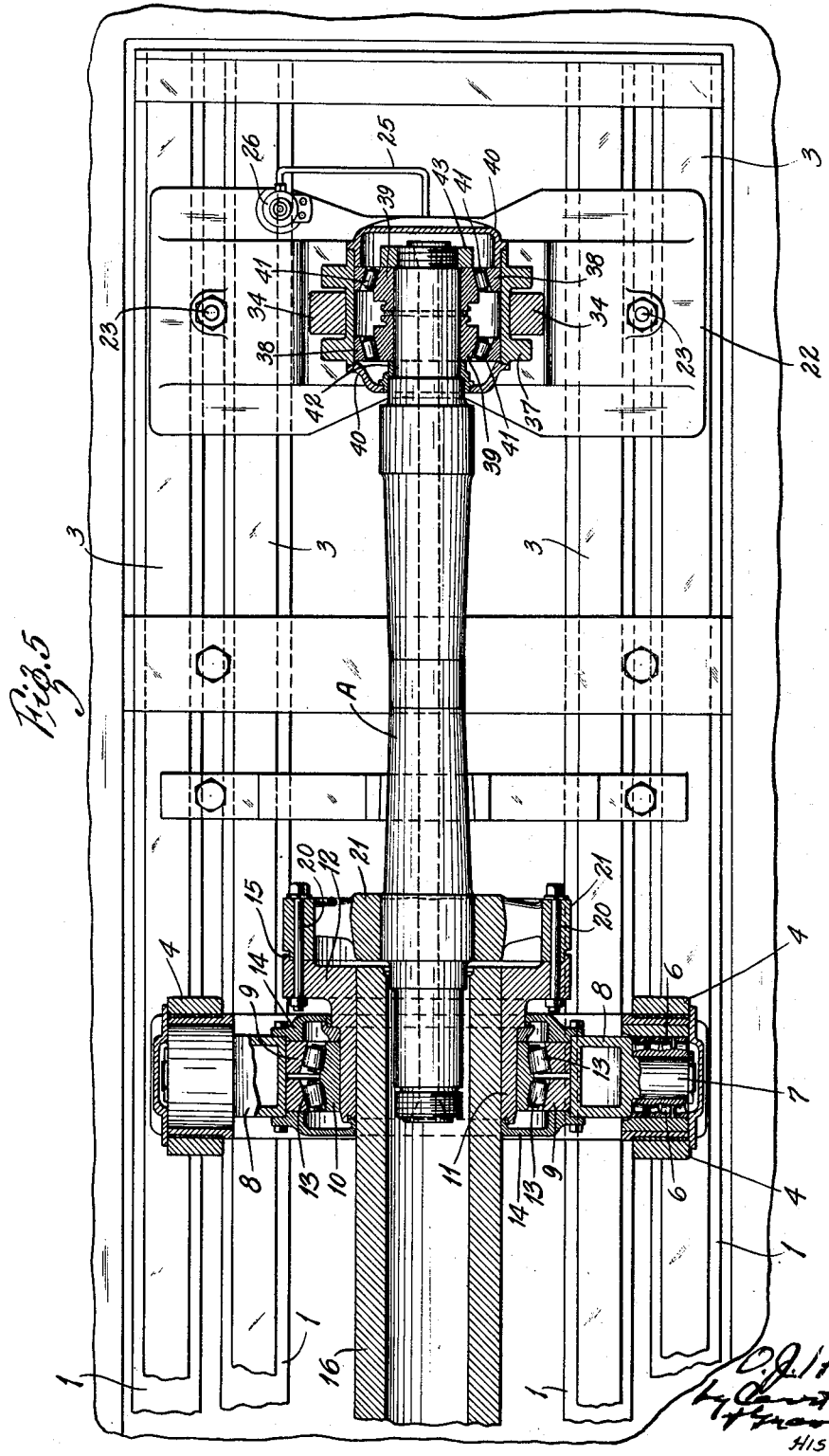
INVENTOR:
HIS ATTORNEYS.

Nov. 21, 1939.  O. J. HORGER  2,180,363
APPARATUS FOR TESTING AXLES AND THE LIKE
Filed Dec. 23, 1937  3 Sheets-Sheet 3
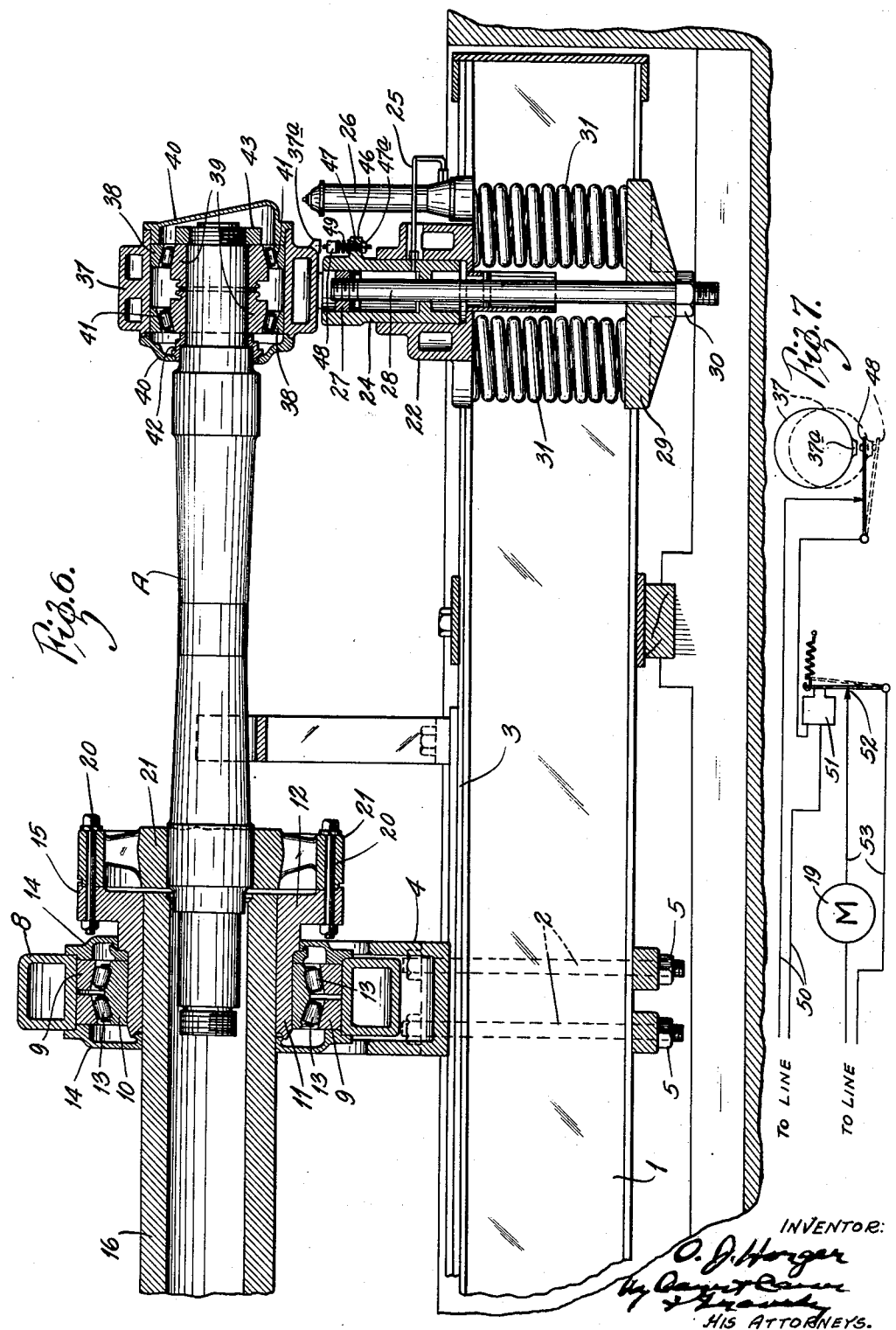

Patented Nov. 21, 1939

2,180,363

UNITED STATES PATENT OFFICE 2,180,363

APPARATUS FOR TESTING AXLES AND THE LIKE

Oscar J. Horger, Canton, Ohio, assignor to The Timken Roller Bearing Company, Canton, Ohio, a corporation of Ohio Application December 23, 1937, Serial No. 181,271

8 Claims. (Cl. 73—51)

One of the common methods of securing wheels to shafts or axles is by press-fitting, that is, by making the bore in the hub of the wheel of slightly less diameter than the diameter of the wheel seat of the shaft or axle and by forcing the wheel endwise onto said seat. Another common method is to expand the hub with heat and allow it to shrink onto the wheel seat. Both methods set up "hoop stresses" in the axle and in the hub and what is said herein regarding press fitting is generally applicable to shrinking fits.

The object of the present invention is to devise an apparatus for investigating press-fitted assemblies, especially locomotive driving axles, and the factors involved therein. The invention consists principally in apparatus for firmly gripping the test specimen with a press-fit, means for rotating said specimen and means for applying a known load transversely thereto while the test specimen is being rotated with or without means for counting the revolutions of said specimen. It also consists in means whereby the deflection of the test specimen may be indicated or utilized to control the operation of the apparatus. It also consists in the means for applying measured load transversely to the free end portion of the test specimen. It also consists in the parts and combinations hereinafter described and claimed.

In the accompanying drawings wherein like reference numbers refer to like parts wherever they occur, Fig. 1 is a plan view of an apparatus embodying my invention with two test specimens mounted therein;

Fig. 2 is a side elevation of said apparatus;

Fig. 3 is an end elevation of said apparatus with the foundation or supports shown in section;

Fig. 4 is a vertical cross section on the line 4—4 of Fig. 2;

Fig. 5 is an enlarged horizontal section of a portion of the apparatus showing a test specimen in place;

Fig. 6 is a vertical longitudinal section of a portion of the apparatus showing a test specimen therein in elevation; and Fig. 7 is a diagram of the wiring system.

The foundation of my apparatus comprises a number of firmly set I-beams 1 arranged parallel with one another and with their webs vertical and their tops flush. There are two I-beams at each side of the apparatus spaced apart far enough to accommodate vertical bolts 2. On top of the respective I-beams are plates or shims 3 which support the ends of heavy cross-members 4 which are held in place by said vertical bolts which extend through flanges on said cross-members and are provided with nuts 5 for clamping said cross-members in place. There are two of these cross-members, each of which is made in the form of an upwardly opening yoke with the ends of its forks disposed at opposite sides of the apparatus and with horizontally alined recesses in the tops thereof adapted to accommodate bearings 6 for trunnions 7 which extend laterally from a main bearing housing 8. This housing is an annular member in which are mounted the outer raceway members 9 of a roller bearing whose inner raceway member or members 10 are mounted on the hub 11 of a work-supporting ring or face plate 12. Conical rollers 13 are interposed between the inner and outer raceway members.

In the bearing illustrated, the inner raceway member has two conical raceways arranged base to base and the outer raceway members or cups are held in position by closure plates 14 which are bolted to the opposite sides of the yoke. The work-supporting ring or face plate 12 is provided with a series of bolt holes that extend longitudinally therethrough near the periphery thereof and the outer surface of said ring or face plate has an annular rib 15 at or close to the periphery thereof.

In the construction illustrated, the main drive shaft or spindle 16 is hollow or tubular and its ends are mounted in the hubs of the work-supporting rings or face plates 12 which are preferably heavily press-fitted on the ends of said hollow shaft or spindle. Said shaft is provided, at some point between the hubs of the work-supporting rings, with pulleys 17 which are connected by belts 18 to the armature shaft of a suitable electric motor 19 or other source of power.

Bolts 20 extend longitudinally through holes provided therefor in the peripheral portion of each face plate or work-supporting ring 12 and through holes provided therefor in a wheel or spider 21 which has a hub which is adapted to be press-fitted onto the axle or other specimen A to be tested.

At convenient distances beyond the respective ends of the hollow driving shaft or spindle are cross pieces 22 whose ends rest on the foundation I-beams 1 and are firmly secured thereon by bolts 23 which extend vertically between said I-beams and which permit of shifting or adjusting said cross pieces endwise of said foundation beams. Each cross piece has a vertical bore therein in which is slidably fitted a vertically disposed hollow cylinder 24 whose interior communicates by a pipe 25 with a hand-operated pump 26 or other suitable source of fluid pressure. Said cylinder is provided with a piston 27 and with a piston rod 28 connected thereto. This piston rod 28 extends downwardly through a hole in a spring abutment piece 29 and has its lower end threaded and provided with a nut 30 that bears against said abutment piece. Helical springs 31 are interposed between said abutment piece and the underside of said cross piece 22. These springs are duly calibrated and of such great length that their pulling strength does not vary substantially within the ordinary range of deflection of the test specimen.

In the construction illustrated, there are four of these helical compression springs for each abutment piece. In the opposite ends of each abutment piece are holes or notches adapted to freely receive vertically disposed bolts 32 whose lower ends are threaded and provided with nuts 33 which bear against the underside of said abutment piece. The bolts 32 extend upwardly freely through the holes provided therefore in the cross piece and their upper portions have threaded engagement with the bottom end portions of strap members 34 that have holes extending horizontally through them. In the top of each of these strap holes is a block 35 with an angular notch in its bottom which rides on a knife edge support provided therefor on a lateral extension 36 of a roller bearing housing 37. These knife edge supports are diametrically opposite and in horizontal alinement. The body of the bearing housing 37 is in the form of a hollow walled ring in whose bore are seated the cups 38 or outer raceway members of taper roller bearings whose inner raceways 39 are conical and preferably convexed endwise. In the construction illustrated, the outer raceway members are held in place by end closure members 40. The inner raceway members 39 are mounted on the axle or other specimen A to be tested in proper relation to the rollers 41 and outer raceway members. In the construction illustrated, an offset spacing ring 42 is interposed between the inner end of the innermost raceway member and the adjacent end closure 40. The outer of the two inner raceway members is held in place by a nut 43 which has threaded engagement with the end of the test specimen A.

The cylinder 24 hereinbefore mentioned has a cross-head 44 at its upper end that has guide lugs or extensions 44a at the opposite ends thereof that are disposed within the vertical openings in the straps or hangers 34. The upper surface of this cross-head is curved to correspond substantially to the curvature of the cylindrical roller bearing housing located thereabove; and said cross-head is supported on the upper ends of adjusting screws 45 with its arcuate upper surface spaced below the roller bearing housing 37. These screws work vertically in threaded holes provided therefor in the cross piece 22 underneath the end portions of the cross-head 44 of the cylinder 24. Thus the height of the cross-head may be adjusted by means of the screws to obtain the desired clearance between said cross-head and the housing 37 thereabove.

The cross-head portion of the cylinder is provided on one side face with an outstanding lug 46 having a vertical hole extending therethrough, in which is mounted a rod 47 which has a suitable, normally closed electric micrometer switch 48 on the upper end thereof, a coil compression spring 49 between said switch and said lug, and a nut 47a for adjusting the clearance between said switch, and an operating lug 37a located on the roller bearing housing 37 in position to open said switch when said axle or test specimen A is deflected a predetermined distance from direct alinement with the axis of the hollow spindle. As shown in Fig. 7, the switch 48 is normally closed in a suitable electric circuit 50 containing a relay or electromagnet 51 whose armature is a normally closed switch 52 in the circuit 53 of the electric motor 19 which drives the hollow spindle 16.

The operation of my apparatus, when used for testing a locomotive axle, as shown in the drawings, is as follows: The wheel or work-mounting spider is pressed onto the wheel seat of the axle and a record made of appropriate data, such as the initial diameters of the wheel seat and of the bore and the length of the contact between them. The wheel or mounting spider is then rigidly secured to the mounting ring at the end of the tubular shaft by means of the bolts extending through the peripheral portions of said spider and of the face plate on the hollow spindle. The operation of centering the axle with relation to the shaft is facilitated by the reduced end of the spider fitting inside the annular rib on the mounting plate by which it is piloted into position. The free end of the axle is assembled with the roller bearing and the straps 34 preferably before the axle is secured to the hollow spindle. The bolts are then passed through the lower ends of the straps 34 and through the stationary cross piece and through the ends of the spring abutment piece and the nuts are then applied to the lower ends of said bolts. The adjusting or elevating screws are then lowered to permit the lugs of the cross-head to rest in the lower ends of the openings in the straps or hangers.

The pump is then operated to force water into the cylinder until the pressure therein registers a predetermined amount on a pressure gage in communication therewith. This pressure is exerted upwardly against the piston and is transmitted through the piston rod and the spring abutment piece to the helical compression springs whose upper ends bear against the undersides of the fixed cross pieces, thereby compressing said springs to the predetermined extent. While the springs are thus compressed, the nuts on the lower ends of the bolts which extend downwardly through the lower ends of the straps 34 are tightened up against the underside of the spring abutment piece. Thereupon, the water is released from the cylinder, but the helical compression springs remain under the pressure imposed by the pump and exert a downward pull on the bearing housing and thereby tend to deflect the axle or other test specimen from true alinement. The cross-head of the cylinder is then raised clear of the bottoms of the openings in the straps or hangers with a clearance left between the arcuate top surface of said cross-head and the underside of the bearing housing located thereabove.

While the parts are in the condition just stated, the motor is started and causes a rotation of the main hollow spindle together with the axle or other test specimen. The velocity and the number of revolutions are indicated or recorded by suitable speedometers and counters associated with the spindle in any ordinary way. The operation continues until the axle deflects to such extent that the lug on the bearing housing engages and opens the normally closed micrometer switch, whereby the relay is de-energized and permits the switch in the motor circuit to open and thus stop the motor. The motor control circuit may be omitted, in which case the deflection of the test specimen may be indicated by any suitable instrument without stopping the motor.

Obviously the test load and the speed are within the control of the operator and may be changed with different specimens. Likewise, the amount of deflection required to close the switch may be varied at will, and one mounting ring or plate may be substituted for another to suit the axle or specimen to be tested and especially to be fitted thereon with the desired pressure.

While the apparatus shown and hereinbefore described is adapted to test two axles simultaneously, it is obvious that it may be used to test only one axle at a time and also that one of the loading devices and the face plate at one end of the hollow spindle may be dispensed with. Likewise other changes may be made without departing from my invention.

The apparatus hereinbefore described affords accurate and convenient means for making divers investigations on deflection and fatigue of the test specimen. It is particularly valuable for determining the effect of press-fitting wheels or collars or sleeves on axles or shafts or other members that are subject to transverse loading and especially such as are subject to continual reversal of the transverse stress. It has been found that the failure of such members by fatigue is progressive and that by setting the control switch to stop the operation when the deflection of the axle reaches a suitable predetermined amount, a reliable test may be made without sacrificing the axle or other test specimen. This is due to the fact that very shallow cracks in the surface of the test specimen may be sufficient to bring about such amount of deflection as will close the control circuit and such shallow cracks do not materially impair the axle or other test specimen.

The effect of press-fitting is not limited to the axle but extends also to the hub of the wheel, ring or sleeve press-fitted on the axle and the effects on such hubs and the factors that are involved may be investigated by means of the apparatus hereinbefore described.

What I claim is:

1. Testing apparatus of the kind described comprising a rotatably mounted hollow shaft, means for rotating said shaft, means for stopping the rotation of said shaft, a hub member adapted to be press-fitted on the wheel seat of a locomotive axle, means for securing said hub member to said shaft in axial alinement therewith with the end of said axle inside of said shaft, means for applying measured load transversely to the outer end portion of said test specimen at a measured distance from the end of said hub member, and means for counting the revolutions of the test specimen, said shaft rotation stopping means comprising an element which is adjacent in a transverse direction to the free end portion of the test specimen so as to be operable by said specimen when the deflection thereof reaches a predetermined amount short of fracture.

2. Testing apparatus of the kind described comprising a rotatably mounted hollow spindle having a face plate at the end thereof, means for rotating said shaft, means for stopping the rotation of said shaft, means for securing an axle to said spindle in axial alinement therewith and comprising a hub portion press-fitted on an axle and an outer portion secured to said face plate, and means for applying measured load transversely to the outer end portion of said test specimen at a measured distance from said securing means and comprising a roller bearing adapted to be mounted on the free end portion of said axle, a housing for said bearing, calibrated springs, and pull rods extending transversely of said axle and connecting said springs to said housing, said shaft rotation stopping means comprising an element which is adjacent in a transverse direction to the free end portion of the axle so as to be operable when the deflection of said axle reaches a predetermined amount.

3. Testing apparatus of the kind described comprising a rotatably mounted hollow shaft, means for rotating said shaft, a hub member adapted to be press-fitted on the wheel seat of an axle, means for securing said hub member to said shaft in axial alinement therewith, with the end of said axle inside of said hollow shaft, means for applying measured load transversely to the outer end portion of said axle at a measured distance from the end of said hub member, an indicator element which is adjacent in a transverse direction to the loading means so as to be operable thereby when the deflection of the axle reaches a predetermined amount.

4. Testing apparatus of the kind described comprising a rotatably mounted shaft having a face plate thereon, means for rotating said shaft, a hub member adapted to be press-fitted on a test specimen, means for securing said hub member to said face plate in axial alinement with said shaft, and means for applying measured load transversely to the outer end portion of said test specimen at a measured distance from said securing means, said load applying means comprising a roller bearing in whose inner raceway member the test specimen is mounted, calibrated springs and pull rods for transmitting the force of said springs to said roller bearing.

5. Testing apparatus of the kind described comprising a rotatably mounted shaft having a face plate thereon, means for rotating said shaft, a hub member adapted to be press-fitted on a test specimen, means for securing said hub member to said face plate in axial alinement with said shaft, and means for applying measured load transversely to the outer end portion of said test specimen at a measured distance from said securing means, said load applying means comprising a roller bearing in whose inner raceway member the test specimen is mounted, calibrated springs and pull rods for transmitting the force of said springs to said roller bearing, and means for loading said springs, said spring loading means comprising a cylinder, a fluid actuated piston therein, a movable abutment for one end of the springs and a fixed abutment for the other end thereof, a rod connecting said piston to said movable abutment and means for applying fluid pressure to said piston, said pull rods having adjustable nuts adapted to bear against said movable abutment.

6. Testing apparatus of the kind described comprising a rotatably mounted shaft having a face plate thereon, means for rotating said shaft, a hub member adapted to be press-fitted on a test specimen, means for securing said hub member to said face plate in axial alinement with said shaft, and means for applying measured load transversely to the outer end portion of said test specimen at a measured distance from said securing means, said load applying means comprising a roller bearing in whose inner raceway member the test specimen is mounted, calibrated springs and pull rods for transmitting the force of said springs to said roller bearing, and means for loading said springs, said spring loading means comprising a cylinder movable radially of the bearing, a fluid actuated piston therein, a movable abutment for one end of the springs and a fixed abutment for the other end thereof, a rod connecting said piston to said movable abutment and means for applying fluid pressure to said piston, said pull rods having adjustable nuts adapted to bear against said movable abutment, said cylinder having an element thereon in position for the load applying bearing to contact with when the test specimen deflects sufficiently.

7. Testing apparatus of the kind described comprising a rotatably mounted hollow shaft having a work supporting ring concentric therewith at the end thereof, means for rotating said shaft, means for securing a test specimen to said shaft in axial alinement therewith, said securing means comprising a hub portion adapted to receive and hold the test specimen with a press-fit and a peripheral portion adapted to be detachably fastened to said ring with the end of the test specimen extending into the bore of said hollow shaft, means for applying measured load transversely to the outer end portion of said test specimen at a measured distance from said securing means, and adjustable means comprising an element which is adjacent in a transverse direction to the free end portion of the test specimen so as to be responsive to the deflection thereof.

8. Testing apparatus of the kind described comprising a rotatably mounted shaft having a face plate thereon, means for rotating said shaft, a hub member adapted to be press-fitted on the wheel seat of a locomotive axle, means for securing said hub member to said face plate in axial alinement with said shaft, and means for applying measured load transversely to the outer end portion of said axle at a measured distance from the end of said hub member, and shaft rotation stopping means comprising an element which is adjacent in a transverse direction to the free end portion of the axle so as to be operable by the load applying means when the deflection of the axle reaches a predetermined amount short of fracture.

OSCAR J. HORGER.